(12) United States Patent
Ben-Yehuda et al.

(10) Patent No.: US 8,392,916 B2
(45) Date of Patent: Mar. 5, 2013

(54) MULTIPLE LAYERS OF VIRTUALIZATION IN A COMPUTING SYSTEM

(75) Inventors: Shmuel Ben-Yehuda, Haifa (IL); Anthony Nicholas Liguori, Austin, TX (US); Orit Luba Wasserman, Mitzpe Aviv (IL); Ben-Ami Yassour, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1101 days.

(21) Appl. No.: 12/347,524

(22) Filed: Dec. 31, 2008

(65) Prior Publication Data

US 2010/0169882 A1 Jul. 1, 2010

(51) Int. Cl.
*G06F 9/30* (2006.01)
(52) U.S. Cl. .......................................................... 718/1
(58) Field of Classification Search ....... 718/1; 717/148
See application file for complete search history.

(56) References Cited

U.S. PATENT DOCUMENTS

| | | | | |
|---|---|---|---|---|
| 4,253,145 A * | 2/1981 | Goldberg | ........................ | 703/21 |
| 2004/0187106 A1 * | 9/2004 | Tanaka et al. | .................... | 718/1 |
| 2005/0160424 A1 * | 7/2005 | Broussard et al. | ............... | 718/1 |
| 2006/0004944 A1 * | 1/2006 | Vij et al. | ........................... | 711/6 |
| 2006/0010440 A1 * | 1/2006 | Anderson et al. | ................. | 718/1 |
| 2007/0028238 A1 * | 2/2007 | Bennett et al. | .................... | 718/1 |
| 2009/0193399 A1 * | 7/2009 | Mitran et al. | ................. | 717/139 |

OTHER PUBLICATIONS

Welsh, Matt. "CS161: Operating Systems". Apr. 24, 2007. 33 pages.*

* cited by examiner

*Primary Examiner* — Robert Fennema
(74) *Attorney, Agent, or Firm* — F. Jason Far-hadian; Century IP Group (57) ABSTRACT

In accordance with one embodiment, a method of nesting a second virtual machine (VM) on a first VM running on a physical machine is provided. The method comprises receiving a first instruction from the physical machine, wherein the first instruction originates from the first VM, wherein a first control structure is associated with the first VM, and wherein a second control structure is associated with the second VM; creating a secondary control structure based on the second control structure associated with the second VM; providing the first instruction and the secondary control structure to the physical machine, wherein the physical machine executes the first instruction according to information included in the secondary control structure; and updating the secondary control structure to correspond to current state or execution environment of the physical machine.

18 Claims, 6 Drawing Sheets

MULTIPLE LAYERS OF VIRTUALIZATION IN A COMPUTING SYSTEM

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to virtualization in a computing system and, more particularly, to providing multiple layers of virtualization in a computing system.

BACKGROUND

In a computing system, a virtual machine (VM) may provide hardware support for software that is incompatible with an underlying hardware system, or physical machine.

For example, a VM may emulate, or virtualize, a processor (CPU) such that an operating system or other software running on the VM interfaces with the VM as if the VM were the physical machine. To implement such virtualization, a control structure may be used to manage information related to the state or execution environment of the VM.

A typical CPU implementing virtualization operates in at least two modes, a non-root mode and a root mode. The CPU normally executes instructions in the non-root mode, but may switch to the root mode to execute a privileged instruction (e.g., a control register instruction, input/output instruction, an interrupt, an exception) or other instruction that the CPU cannot execute directly. Switching to the root mode is referred to as a VM exit, and switching back to the non-root mode is referred to as a VM entry.

Existing x86 virtualization technologies make it possible to run multiple VMs on a physical machine. Unfortunately, such virtualization technologies implement the multiple VMs side-by-side, or in parallel, on the physical machine, and are thus limited to providing a single layer of virtualization.

Systems and methods are needed to overcome the above-mentioned shortcomings.

SUMMARY

The present disclosure is directed to systems and corresponding methods that facilitate providing multiple layers of virtualization in a computing system.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method of nesting a second virtual machine (VM) on a first VM running on a physical machine is provided. The method comprises receiving a first instruction from the physical machine, wherein the first instruction originates from the first VM, wherein a first control structure is associated with the first VM, and wherein a second control structure is associated with the second VM; creating a secondary control structure based on the second control structure associated with the second VM; providing the first instruction and the secondary control structure to the physical machine, wherein the physical machine executes the first instruction according to information included in the secondary control structure; and updating the secondary control structure to correspond to current state or execution environment of the physical machine.

The first instruction may be modified to be compatible with the physical machine to improve performance of the physical machine. The physical machine operates in a first or second mode. In the first mode, the physical machine executes a first type of instructions and in the second mode the physical machine executes a second type of instructions with the support of a VM. Desirably, the physical machine switches to the second mode prior to the instruction being received and to the first mode after executing the instruction. A physical address of the first VM is replaced by a physical address of the second VM and a secondary page table associated with the second VM is created.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EMBODIMENTS

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
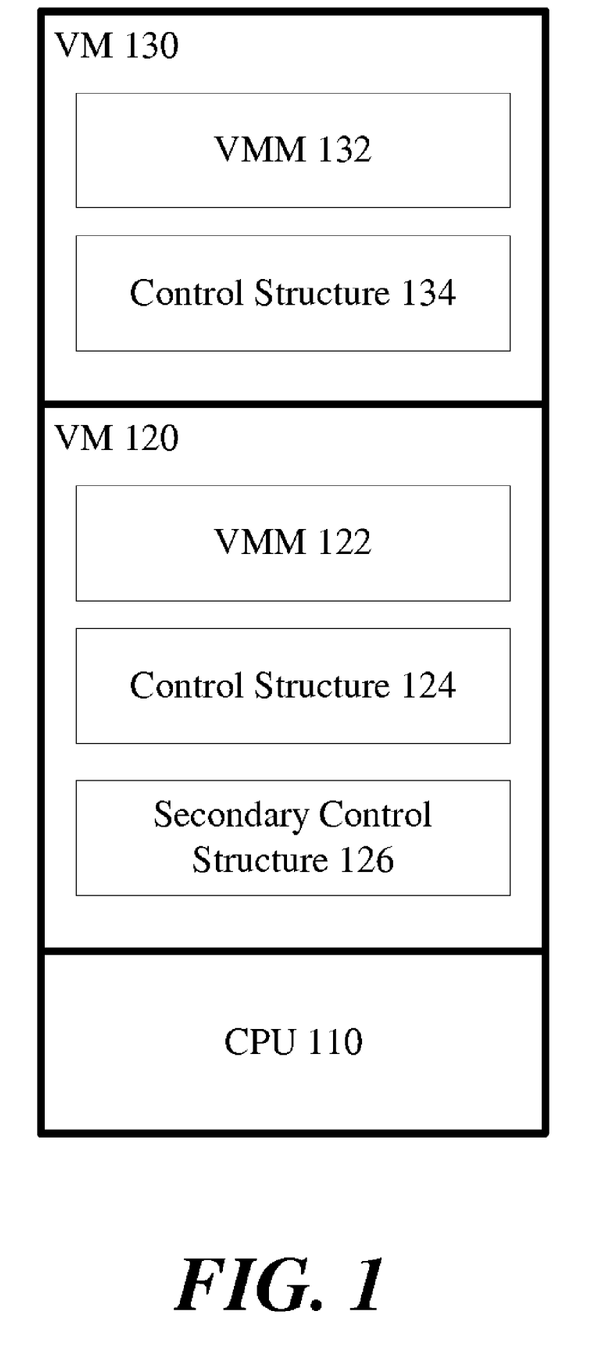
FIG. 1 is a block diagram of an exemplary computing system with two layers of virtualization, in accordance with one embodiment.

Referring to FIG. 1, in accordance with one embodiment, an exemplary computing system comprises a physical machine (hereafter referred to by way of example as CPU 110), a VM 120, and a VM 130. The VM 120 runs on and emulates the CPU 110, providing a first layer of virtualization, and the VM 130 is a nested VM that runs on and emulates the VM 120, providing a second layer of virtualization.

The VM 120 and VM 130 are managed by VMM 122 and VMM 132, respectively. The VM 120 may create or update control structure 124 and secondary control structure 126. The VM 130 may create or update control structure 134. The control structures 124, 134 may be used to manage information related to the state or execution environment of the VM 120 and VM 130, respectively, as provided in more detail below.

Figure 2:
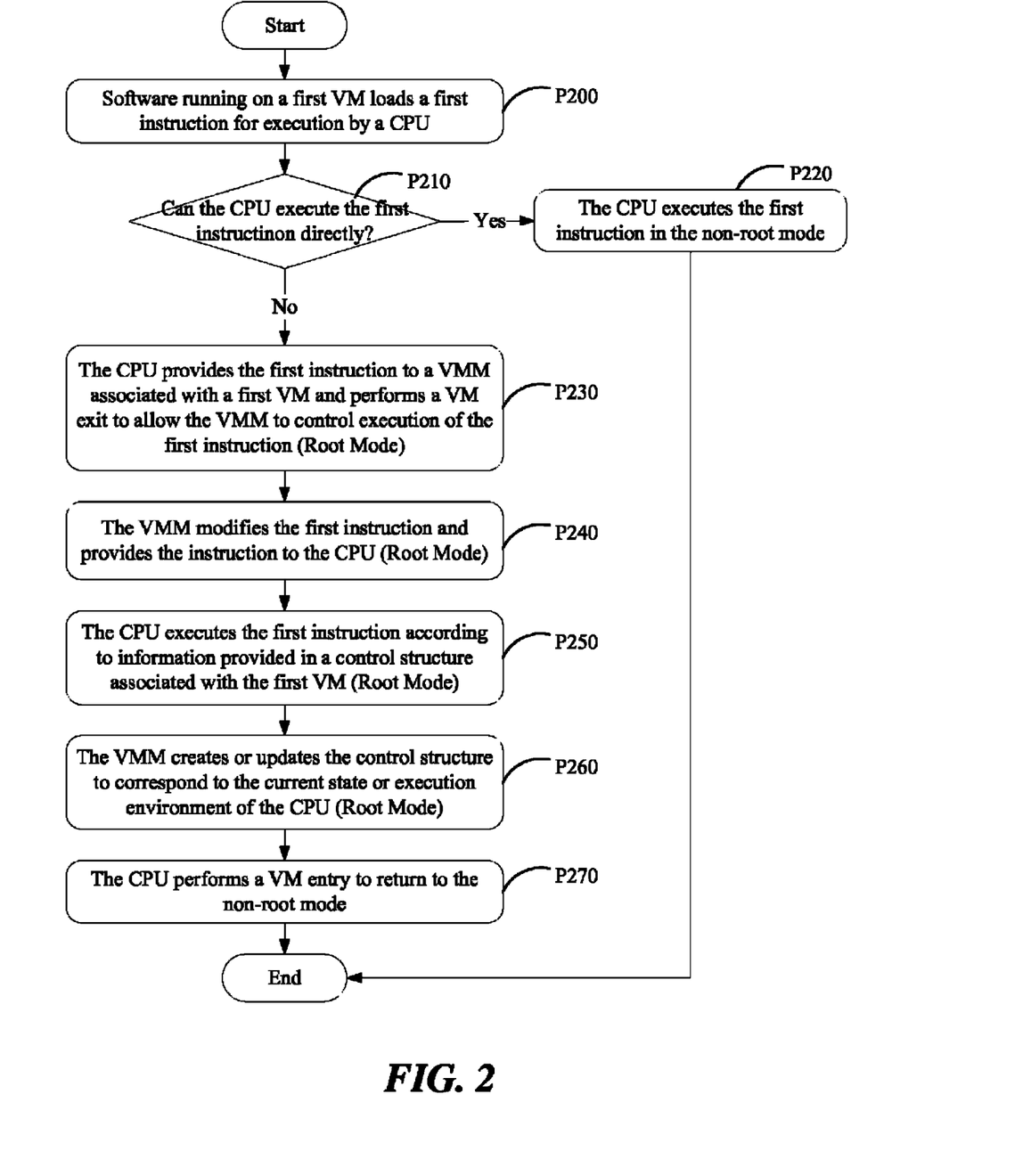
FIG. 2 is a flow diagram illustrating a method for executing an instruction originating from a non-nested VM, in accordance with one embodiment.

Referring to FIGS. 1 and 2, in accordance with one embodiment, software (e.g., an operating system) running on the VM 120 may load an instruction for execution by the CPU 110 (P200). If the CPU 110 is able to execute the instruction (P210), the CPU 110 may directly execute the instruction in the non-root mode (P220). Otherwise, a trap, or exception, occurs. In response to the trap, the CPU 110 may provide the instruction to the VMM 122 and perform a VM exit to allow VMM 122 to control execution of the instruction in the root mode (P230).

While in the root mode, upon receiving the instruction, the VMM 122 may modify the instruction and provide the instruction to the CPU 110 for execution according to information included in the control structure 124 (P240, P250). Once the instruction is executed in the root mode, the VMM 122 may update the control structure 124 so that the state or execution environment of the VM 120 corresponds to the current state or execution environment of the CPU 110 (P260). Thereafter, the CPU 110 may perform a VM entry to return to the non-root mode (P270).

Advantageously, the above scheme allows software running on the VM 120 to seamlessly interface with CPU 110 without having to know the particular details of the underlying CPU 110 hardware structure. Depending on implementation such arrangement improves system performance and reduces design complexity of the physical machine.

Figure 3:
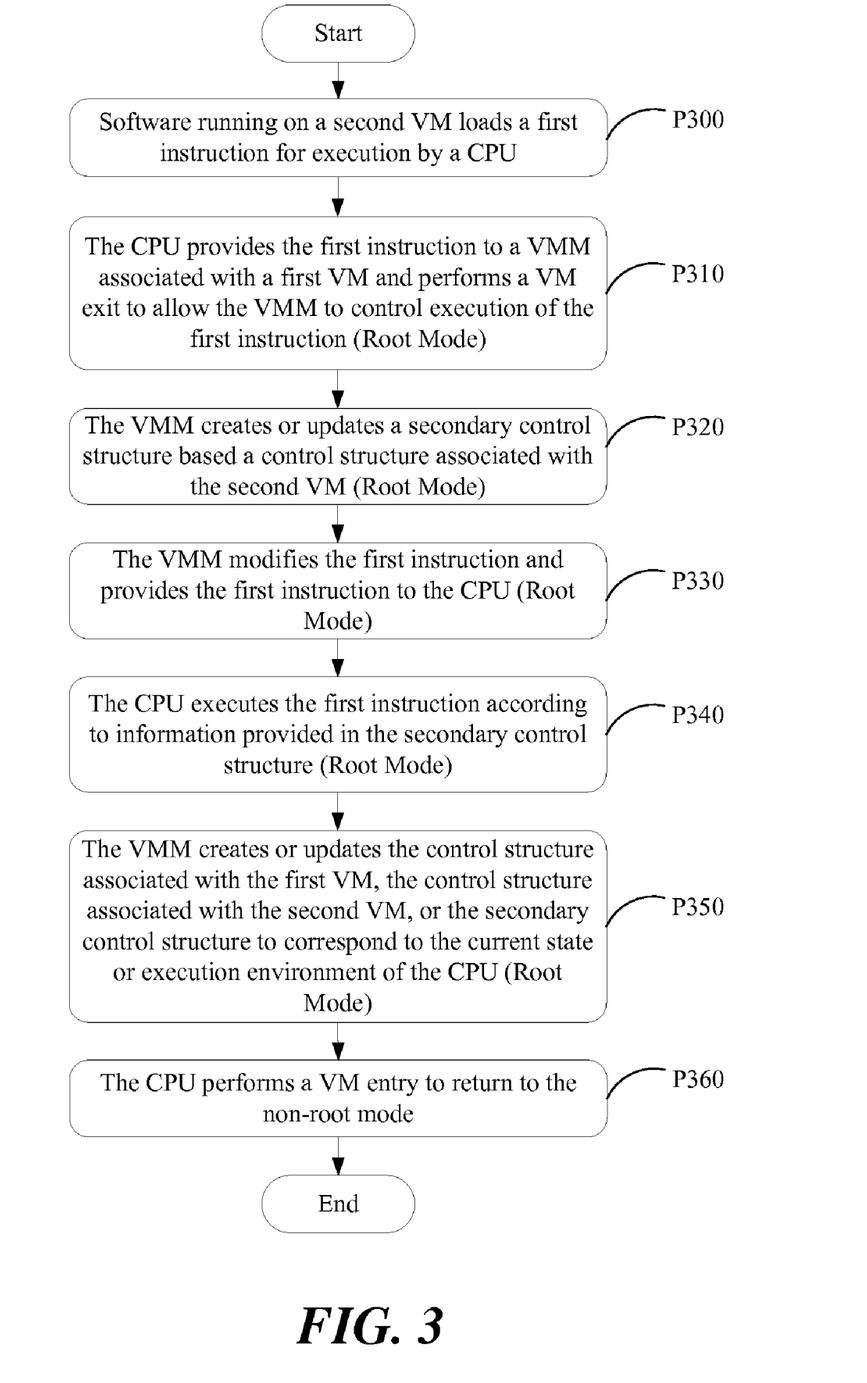
FIG. 3 is a flow diagram illustrating a method for executing an instruction originating from a nested VM, in accordance with one embodiment.
Figure 4:
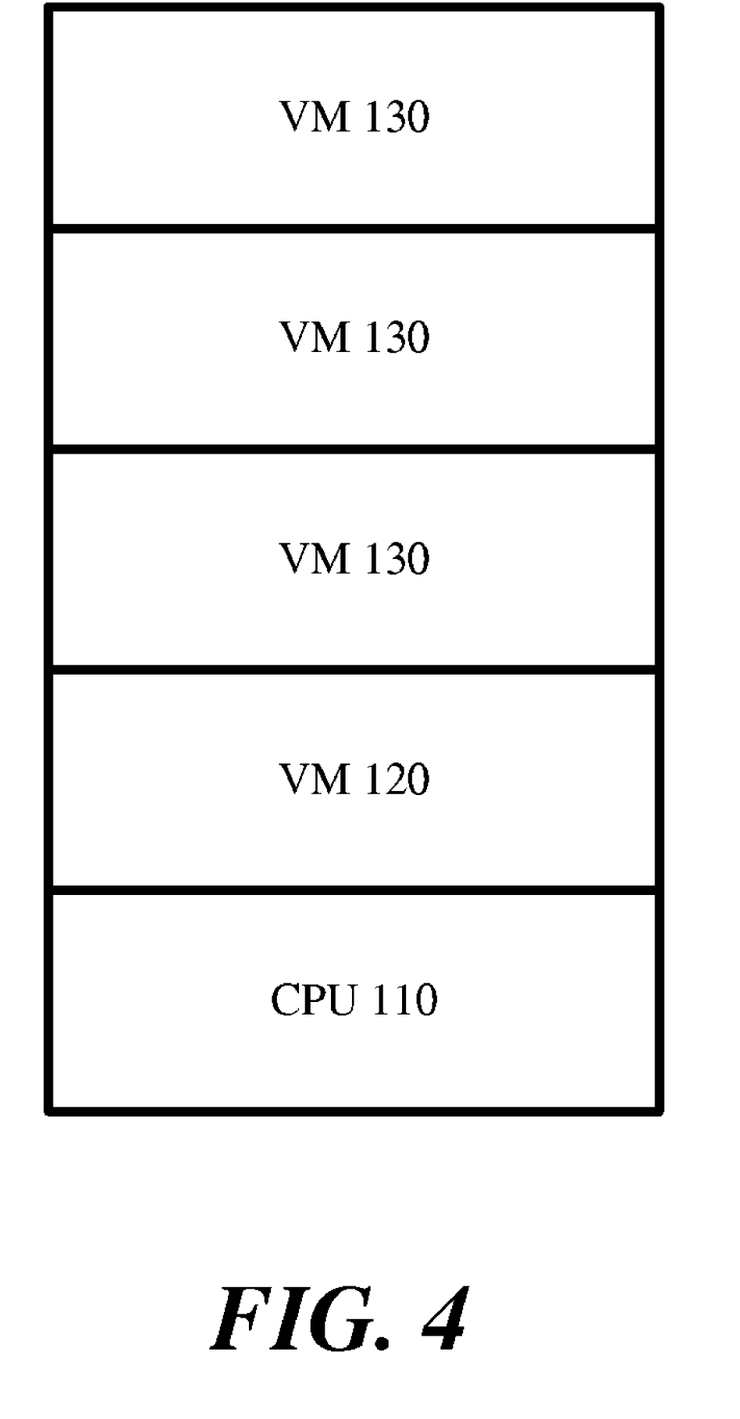
FIG. 4 is a block diagram of a computing system with more than two layers of virtualization, in accordance with one embodiment.

Referring to FIGS. 1 and 3, in accordance with one embodiment, a trap may occur in response to software running on the VM 130 loading an instruction for execution by the CPU 110 (P300). The CPU 110 may forward the instruction to the VMM 122 and perform a VM exit to allow VMM 122 to control execution of the instruction in the root mode (P310).

Since the instruction originates from VM 130, the CPU 110 may be unable to execute the instruction according to information provided in the control structure 124. In response, the VMM 122 may create or update the secondary control structure 126 based on the control structure 134 (P320). The secondary control structure 126 may not be an exact copy of the control structure 134. For example, state information associated with the VM 130 that is not appropriate for the VM 120 may be replaced with state information associated with the VM 120.

Depending on implementation, a secondary page table for mapping virtual memory to physical memory may also be created and updated for each nested VM in the same manner as secondary control structure 126. In one embodiment, the secondary page table may be included in the secondary control structure 126, for example.

Referring back to FIGS. 1 and 3, the VMM 122 may modify the instruction and provide the instruction to the CPU 110 for execution according to information included in the secondary control structure 126 (P330, P340). Once the instruction is executed, the VMM 122 may update the control structure 124, the secondary control structure 126, or the control structure 134 to correspond to the current state or execution environment of the CPU 110 (P350), and the CPU 110 may perform a VM entry to return to the non-root mode (P360).

Figure 5:
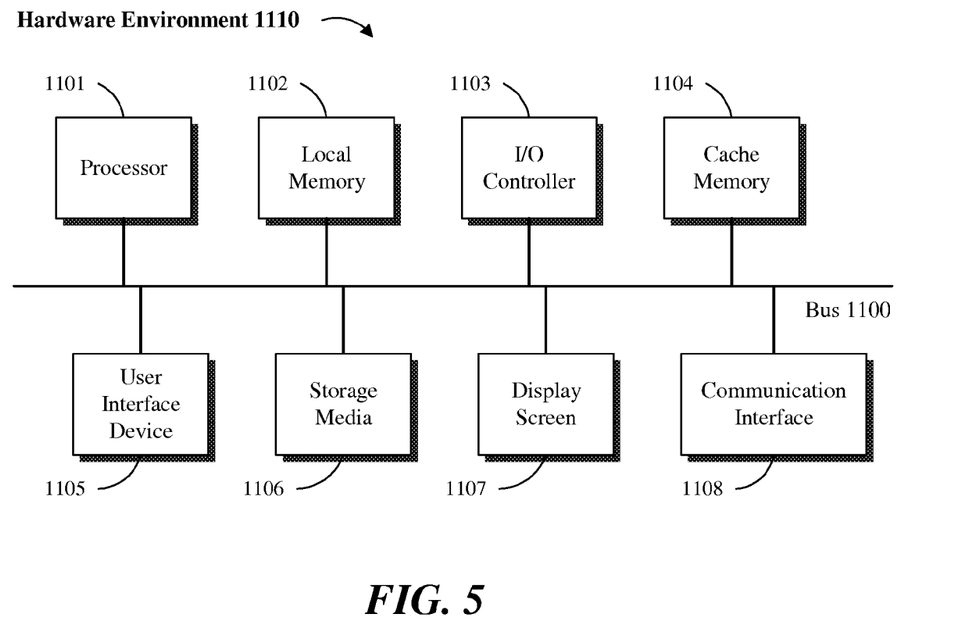
FIGS. 5 and 6 are block diagrams of hardware and software environments in which a system of the present invention may operate, in accordance with one or more embodiments.

It is noteworthy that the above methods may also be applied to a computing system comprising more than one nested VM 130. For example, if a computing system comprises three nested VMs 130, as shown in FIG. 5 in accordance with one embodiment, the instruction is forwarded from the CPU 110, to the VM 122, to the first VM 130, and then to the second VM 130. The first and second VM 130 each create and update a secondary control structure that may be provided to the CPU 110.

It is also noteworthy that existing x86 virtualization technologies (e.g., Intel x86 VT) may cause the CPU to perform an additional VM exit for read and write instructions, which may or may not be suitable in the context of the presently disclosed subject matter. Thus, in accordance with one embodiment, the additional VM exit may be removed from each read and write instruction to improve performance.

In different embodiments, the invention may be implemented either entirely in the form of hardware or entirely in the form of software, or a combination of both hardware and software elements. For example, the CPU 110, VM 120, and VM 130 may comprise a controlled computing system environment that can be presented largely in terms of hardware components and software code executed to perform processes that achieve the results contemplated by the system of the present invention.

Figure 6:
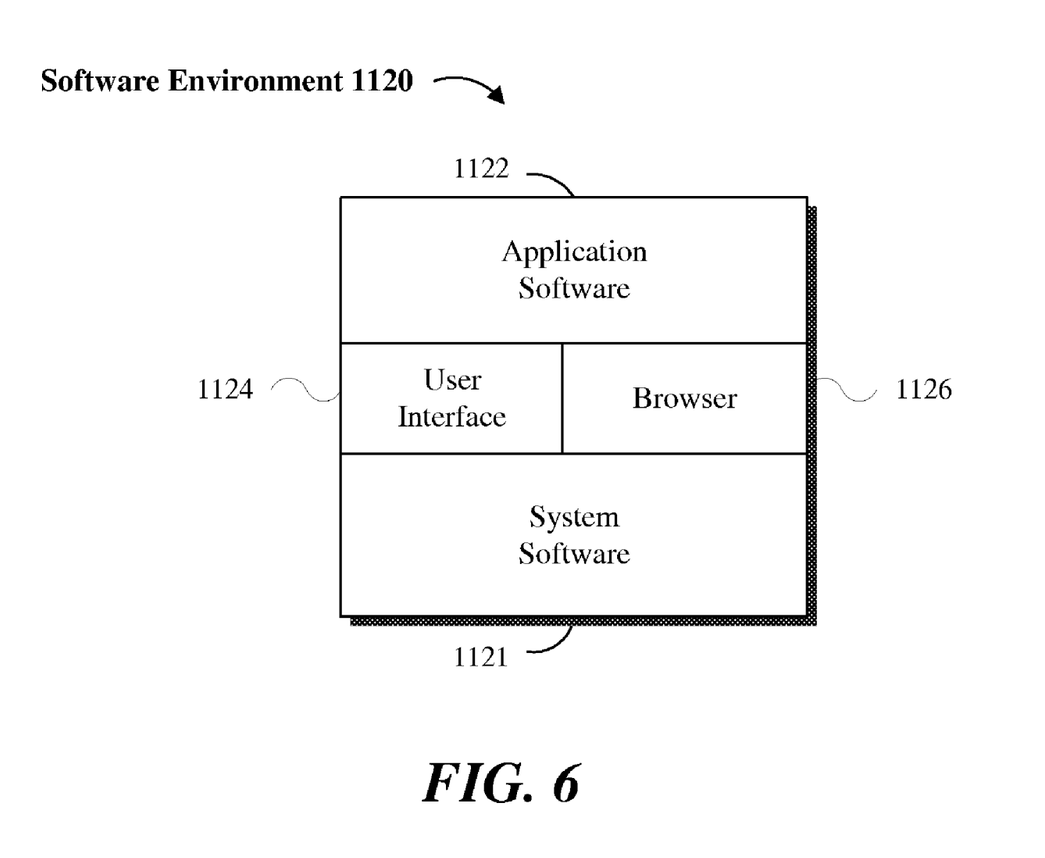

Referring to FIGS. 5 and 6, a computing system environment in accordance with an exemplary embodiment is composed of a hardware environment 1110 and a software environment 1120. The hardware environment 1110 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. In one embodiment, VMM 122 and VMM 132 may be implemented as system software 1121 or application software 1122 executed on one or more hardware environments to provide multiple layers of virtualization.

System software 1121 comprises control programs, such as the operating system (OS) and information management systems that instruct the hardware how to function and process information. Application software 1122 may comprise but not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 5, an embodiment of the application software 1122 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 6, application software 1122 may comprise one or more computer programs that are executed on top of system software 1121 after being loaded from storage media 1106 into local memory 1102. In a client-server architecture, application software 1122 may comprise client software and server software.

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

The present invention has been described above with reference to one or more features or embodiments. Those skilled in the art will recognize, however, that changes and modifications may be made to these embodiments without departing from the scope of the present invention. These and various other adaptations and combinations of the embodiments disclosed are within the scope of the invention and are further defined by the claims and their full scope of equivalents.

What is claimed is:

1. A method for providing multiple layers of virtualization in a computing environment, the method comprising:
    executing one or more instructions by a physical machine, wherein a first virtual machine is executed on the physical machine and a second virtual machine is executed on the first virtual machine in a nested execution environment;
    executing a first instruction loaded by the first virtual machine, in a first mode, according to information provided in a first control structure associated with the first virtual machine, wherein the first control structure comprises information about state or execution environment of the first virtual machine;
    executing a second instruction loaded by the second virtual machine, in the first mode, according to information provided in a second control structure associated with the second virtual machine, wherein the second control structure comprises information about state or execution environment of the second virtual machine; and
    in response to determining that a target instruction loaded by the second virtual machine is to be executed by the physical machine in a second mode as controlled by the first virtual machine, creating a secondary control structure, wherein the secondary control structure is implemented based on information in both the first control structure and the second control structure to allow the physical machine execute the target instruction according to execution environment information for the second virtual machine and state information for the first virtual machine in the second mode.

2. The method of claim 1 wherein the first mode is a non-root mode.

3. The method of claim 1 wherein the second mode is a root mode.

4. The method of claim 1 wherein in the second mode control for execution of the target instruction is transferred from the second VM to the first VM.

5. The method of claim 4 wherein the control for execution of the target instruction is transferred from the second VM to the first VM, in response to the physical machine performing a VM exit when receiving the target instruction from the second VM.

6. The method of claim 1 wherein the secondary control structure comprises a page table for mapping virtual memory associated with the second VM to physical memory utilized by the physical machine for the purpose of performing the target instruction.

7. A system for providing multiple layers of virtualization in a computing environment, the system comprising:
   a physical machine for executing one or more instructions, wherein a first virtual machine is executed on the physical machine and a second virtual machine is executed on the first virtual machine in a nested execution environment;
   wherein a first instruction loaded by the first virtual machine is executed, in a first mode, according to information provided in a first control structure associated with the first virtual machine, wherein the first control structure comprises information about state or execution environment of the first virtual machine;
   wherein a second instruction loaded by the second virtual machine is executed, in the first mode, according to information provided in a second control structure associated with the second virtual machine, wherein the second control structure comprises information about state or execution environment of the second virtual machine; and
   in response to determining that a target instruction loaded by the second virtual machine is to be executed by the physical machine in a second mode as controlled by the first virtual machine, a secondary control structure is created, wherein the secondary control structure is implemented based on information in both the first control structure and the second control structure to allow the physical machine execute the target instruction according to execution environment information for the second virtual machine and state information for the first virtual machine in the second mode.

8. The system of claim 7 wherein the first mode is a non-root mode.

9. The system of claim 7 wherein the second mode is a root mode.

10. The system of claim 7 wherein in the second mode control for execution of the target instruction is transferred from the second VM to the first VM.

11. The system of claim 10 wherein the control for execution of the target instruction is transferred from the second VM to the first VM, in response to the physical machine performing a VM exit when receiving the target instruction from the second VM.

12. The system of claim 7 wherein the secondary control structure comprises a page table for mapping virtual memory associated with the second VM to physical memory utilized by the physical machine for the purpose of performing the target instruction.

13. A computer program product comprising logic code embedded on a non-transitory data storage medium, wherein execution of the logic code on a physical machine causes the physical machine to:
   execute one or more instructions, wherein a first virtual machine is executed on the physical machine and a second virtual machine is executed on the first virtual machine in a nested execution environment;
   execute a first instruction loaded by the first virtual machine, in a first mode, according to information provided in a first control structure associated with the first virtual machine, wherein the first control structure comprises information about state or execution environment of the first virtual machine;
   execute a second instruction loaded by the second virtual machine, in the first mode, according to information provided in a second control structure associated with the second virtual machine, wherein the second control structure comprises information about state or execution environment of the second virtual machine; and
   in response to determining that a target instruction loaded by the second virtual machine is to be executed by the physical machine in a second mode as controlled by the first virtual machine, create a secondary control structure, wherein the secondary control structure is implemented based on information in both the first control structure and the second control structure to allow the physical machine execute the target instruction according to execution environment information for the second virtual machine and state information for the first virtual machine in the second mode.

14. The computer program product of claim 13 wherein the first mode is a non-root mode.

15. The computer program product of claim 13 wherein the second mode is a root mode.

16. The computer program product of claim 13 wherein in the second mode control for execution of the target instruction is transferred from the second VM to the first VM.

17. The computer program product of claim 16 wherein the control for execution of the target instruction is transferred from the second VM to the first VM, in response to the physical machine performing a VM exit when receiving the target instruction from the second VM.

18. The computer program product of claim 13 wherein the secondary control structure comprises a page table for mapping virtual memory associated with the second VM to physical memory utilized by the physical machine for the purpose of performing the target instruction.

* * * * *